US010403152B2

(12) United States Patent
Johnson et al.

(10) Patent No.: US 10,403,152 B2
(45) Date of Patent: Sep. 3, 2019

(54) COMPUTING SYSTEM AND METHOD FOR IDENTIFYING SIMILAR MAPS OF A PORT OF INTEREST

(71) Applicant: THE BOEING COMPANY, Chicago, IL (US)

(72) Inventors: Keith Lorentz Johnson, Seattle, WA (US); John Desmond Whelan, Burien, WA (US)

(73) Assignee: THE BOEING COMPANY, Chicago, IL (US)

( * ) Notice: Subject to any disclaimer, the term of this patent is extended or adjusted under 35 U.S.C. 154(b) by 2 days.

(21) Appl. No.: 15/702,473

(22) Filed: Sep. 12, 2017

(65) Prior Publication Data

US 2019/0080616 A1    Mar. 14, 2019

(51) Int. Cl.
*G01C 21/26* (2006.01)
*G08G 5/00* (2006.01)
*G09B 29/10* (2006.01)
*G08G 5/06* (2006.01)

(52) U.S. Cl.
CPC .......... *G08G 5/0021* (2013.01); *G01C 21/26* (2013.01); *G08G 5/065* (2013.01); *G09B 29/106* (2013.01)

(58) Field of Classification Search
CPC ...... G08G 5/0021; G08G 5/065; G01C 21/26; G09B 29/106
USPC .......................................................... 340/972
See application file for complete search history.

(56) References Cited

U.S. PATENT DOCUMENTS

| | | | | |
|---|---|---|---|---|
| 5,528,248 A | * | 6/1996 | Steiner | G01C 21/20 342/357.31 |
| 8,533,180 B2 | * | 9/2013 | Pschierer | G01C 21/00 707/717 |
| 2005/0283305 A1 | * | 12/2005 | Clark | G01C 23/00 701/120 |
| 2010/0106514 A1 | * | 4/2010 | Cox | G01C 21/20 705/1.1 |
| 2012/0136562 A1 | * | 5/2012 | Mere | G08G 5/0021 701/120 |
| 2018/0157669 A1 | * | 6/2018 | Naghdy | G06F 17/30061 |

* cited by examiner

*Primary Examiner* — Steven Lim
*Assistant Examiner* — Kam Wan Ma
(74) *Attorney, Agent, or Firm* — Alston & Bird LLP

(57) ABSTRACT

A computing system, method and computer program product are provided to present additional information regarding a map of a port of interest, such as an airport. In the context of a computing system, the computing system includes processing circuitry configured to receive an indication of a map of a port of interest and to compare attributes representative of the map of the port of interest to attributes representative of one or more maps of other ports. The processing circuitry is also configured to identify at least one of the one or more maps of other ports to satisfy a similarity threshold based upon a comparison of the attributes. The computing system also includes a user interface responsive to the processing circuitry and configured to provide information regarding the at least one of the one or more maps of other ports along with the map of the port of interest.

20 Claims, 5 Drawing Sheets

COMPUTING SYSTEM AND METHOD FOR IDENTIFYING SIMILAR MAPS OF A PORT OF INTEREST

TECHNICAL FIELD

An example embodiment relates generally to the analysis of maps of various ports and, more particularly, to the identification of one or more maps that are similar to a map of a port of interest.

BACKGROUND

Maps are frequently used for various purposes including for navigation in and around a port, such as an airport, a harbor or the like. With respect to an airport, for example, a pilot may reference a map of the airport in order to determine the configuration of the runways and taxiways and to identify the route to be taken to taxi about the airport, such as between a terminal gate and a respective runway. In order to facilitate review by a pilot prior to and/or during a flight, the map of an airport may be presented upon the flight deck display of the instrument panel of an aircraft. In addition to the graphical depiction of the airport, an airport map may also include one or more rules that govern navigation in or about the airport. For example, the rules may specify the manner in which the various runways or taxiways are to be utilized, such as the direction in which aircraft may move along a runway or taxiway, the maximum speed at which an aircraft may travel along a runway or taxiway, the priority of usage of a runway or taxiway or the like. As such, by referencing an airport map, a pilot may control an aircraft so as to move about the airport in an efficient and safe manner.

In some instances, an airport map may not be as readily understood as desired. For example, different airport maps may represent the same or similar features with different symbology. Thus, a pilot who is unfamiliar with a particular airport may be challenged to quickly interpret a map of the airport if the map utilizes different symbology than that with which the pilot is familiar. Further, aircraft are sometimes diverted during flight so as to land at an airport different than the airport that was the original destination. In these instances, the aircraft may be diverted to an airport with which the pilot is unfamiliar. In the process of diverting to the different airport, the pilot may reference a map of the airport to which the aircraft has been diverted. Due to the unfamiliarity of the pilot with the airport, however, the pilot may struggle to properly interpret and fully appreciate the various features of the airport to which the aircraft has been diverted, particularly while performing the myriad of other tasks required of the pilot during flight. As such, in these instances, pilots generally rely upon their experience, intuition and general aviation knowledge in order to navigate about airports with which they are less familiar. However, the ability of pilots to navigate about unfamiliar airports based upon experience, intuition and general knowledge will obviously vary from airport to airport and from pilot to pilot.

BRIEF SUMMARY

A computing system, method and computer program product are provided in accordance with an example embodiment in order to provide additional information regarding a map of a port of interest, such as an airport, a harbor or the like. As such, the map of the port of interest may be more readily interpreted in light of the additional information, thereby facilitating navigation about the port. The computing device, method and computer program product of an example embodiment provide additional information in the form of one or more maps of other ports that are similar to the map of the port of interest. By drawing upon the similarities, the map of the port of interest may be more readily interpreted, thereby facilitating navigation about the port of interest in an efficient and safe manner.

In an example embodiment, a computing system is provided that includes processing circuitry configured to receive an indication of a map of a port of interest and to compare attributes representative of the map of the port of interest to attributes representative of one or more maps of other ports. The processing circuitry is also configured to identify at least one of the one or more maps of other ports to satisfy a similarity threshold based upon a comparison of the attributes. The computing system of this example embodiment also includes a user interface responsive to the processing circuitry and configured to provide information regarding the at least one of the one or more maps of other ports along with the map of the port of interest.

In an example embodiment, the map of the port of interest includes an airport map of an airport of interest. Correspondingly, the one or more maps of other ports of interest include one or more airport maps of other airports. In this embodiment, the attributes include one or more runways or one or more taxiways.

In an embodiment in which the port of interest and the other ports have a plurality of rules associated therewith, the processing circuitry is further configured to compare attributes representative of the rules of the port of interest to attributes representative of the rules of one or more other ports. The processing circuitry of an example embodiment is configured to identify at least one of the one or more maps of other ports by identifying the at least one of the one or more maps of other ports that are most similar to the map of the port of interest. In an example embodiment, the user interface is configured to provide information regarding the at least one of the one or more maps of other ports by providing a visible indication of one or more features of the at least one of the one or more maps of other ports for which information is provided that are in common with the one or more corresponding features of the map of the port of interest.

In an embodiment in which at least some of the attributes include a category and a corresponding value, the processing circuitry is configured to compare attributes by comparing the category of an attribute representative of the map of the port of interest to the category of a corresponding attribute representative of one or more maps of other ports. In an instance in which the categories match, the processing circuitry is also configured to compare the value associated with the category of the attribute representative of the map of the port of interest to the value associated with the category of the corresponding attribute representative of one or more maps of other ports.

In another embodiment, a method is provided that includes receiving an indication of a map of a port of interest and comparing attributes representative of the map of the port of interest to attributes representative of one or more maps of other ports. The method also includes identifying at least one of the one or more maps of other ports to satisfy a similarity threshold based upon a comparison of the attributes. The method further includes causing information regarding the at least one of the one or more maps of other ports to be provided along with the map of the port of interest.

The map of the port of interest may include an airport map of an airport of interest and the one or more maps of other ports of interest may include one or more airport maps of other airports. In this example embodiment, the attributes may include one or more runways or one or more taxiways.

In an embodiment in which the port of interest and the other ports have a plurality of rules associated therewith, the method further includes comparing attributes representative of the rules of the port of interest to attributes representative of the rules of one or more other ports. The method of an example embodiment identifies at least one of the one or more maps of other ports by identifying the at least one of the one or more maps of other ports that are most similar to the map of the port of interest. The method of an example embodiment causes information regarding the at least one of the one or more maps of the ports to be provided by providing a visible indication of one or more features of the at least one of the one or more maps of other ports for which information is provided that are in common with the one or more corresponding features of the map of the port of interest.

In an embodiment in which at least some of the attributes include a category and a corresponding value, the method compares attributes by comparing the category of an attribute representative of the map of the port of interest to the category of a corresponding attribute representative of one or more maps of other ports. In an instance in which the categories match, the method compares the values associated with the category of the attribute representative of the map of the port of interest to the value associated with the category of the corresponding attribute representative of one or more maps of other ports.

In a further embodiment, a computer program product is provided that includes a non-transitory computer readable storage medium that, in turn, includes instructions that, when executed, are configured to receive an indication of a map of a port of interest. The instructions are also configured to compare attributes representative of the map of the port of interest to attributes representative of one or more maps of other ports. The instructions are additionally configured to identify at least one of the one or more maps of other ports to satisfy a similarity threshold based upon a comparison of the attributes. The instructions are further configured to cause information regarding the at least one of the one or more maps of other ports to be provided along with the map of the port of interest.

In one embodiment, the map of the port of interest includes an airport map of an airport of interest and the one or more maps of other ports of interest include one or more airport maps of other airports. In this example embodiment, the attributes also include one or more runways or one or more taxiways.

In an instance in which the port of interest and the other ports have a plurality of rules associated therewith, the computer readable storage medium of an example embodiment includes instructions that are further configured to compare attributes representative of the rules of the port of interest to attributes representative of the rules of one or more other ports. In an example embodiment, the instructions configured to identify at least one of the one or more maps of other ports include instructions configured to identify the at least one of the one or more maps of other ports that are most similar to the map of the port of interest. In an example embodiment, the instructions configured to provide information regarding the at least one of the one or more maps of other ports include instructions configured to provide a visible indication of one or more features of the at least one of the one or more maps of other ports for which information is provided that are in common with one or more corresponding features of the map of the port of interest.

In an embodiment in which at least some of the attributes include a category and a corresponding value, the instructions configured to compare attributes include instructions configured to compare the category of an attribute representative of the map of the port of interest to the category of a corresponding attribute representative of one or more maps of other ports. In an instance in which the categories match, the instructions configured to compare attributes further include instructions configured to compare the value associated with the category of the attribute representative of the map of the port of interest to the value associated with the category of the corresponding attribute representative of one or more maps of other ports.

BRIEF DESCRIPTION OF THE DRAWINGS

Figure 1:
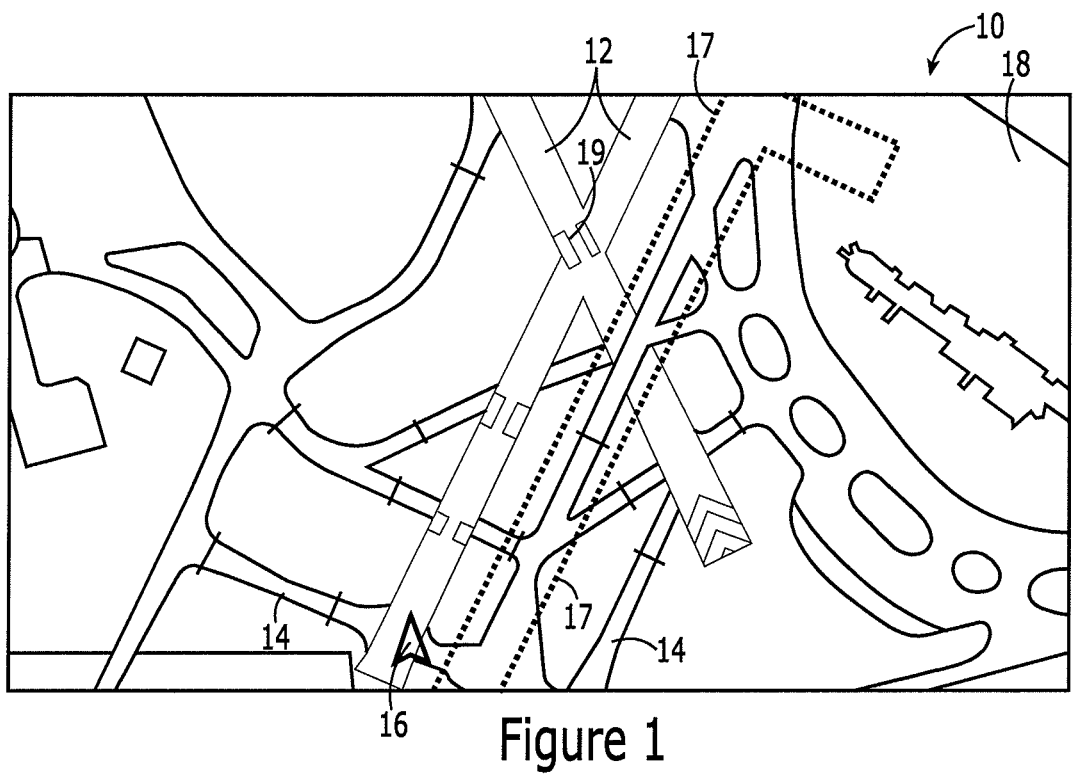
Figure 2:
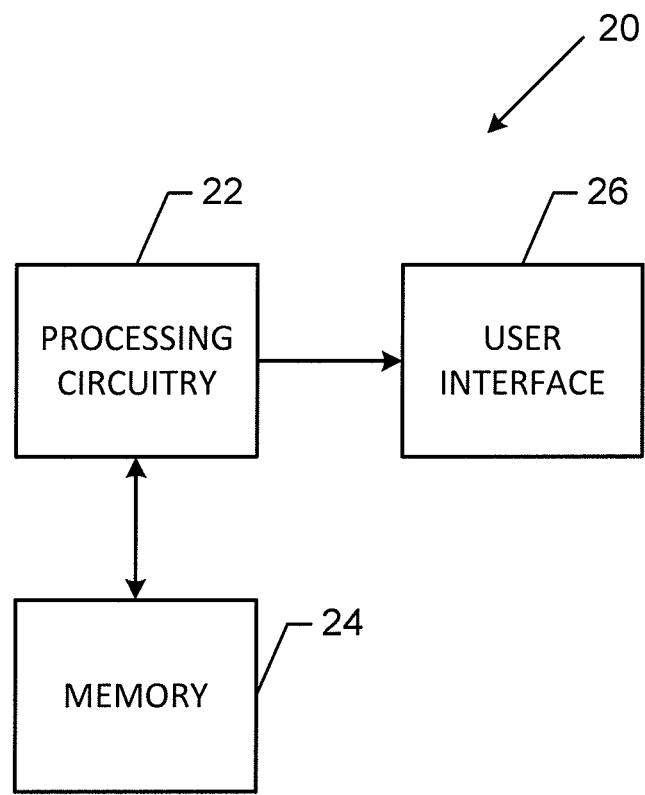
Figure 3:
Figure 4:
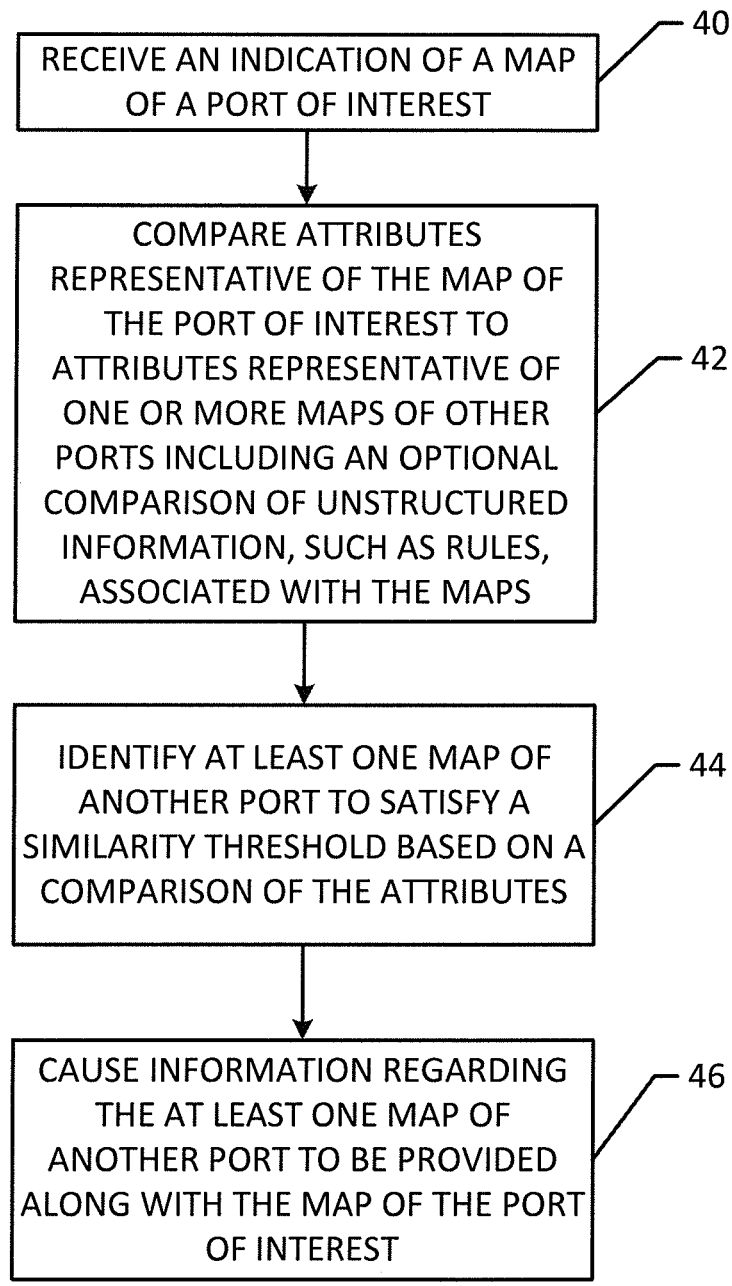
Figure 5:
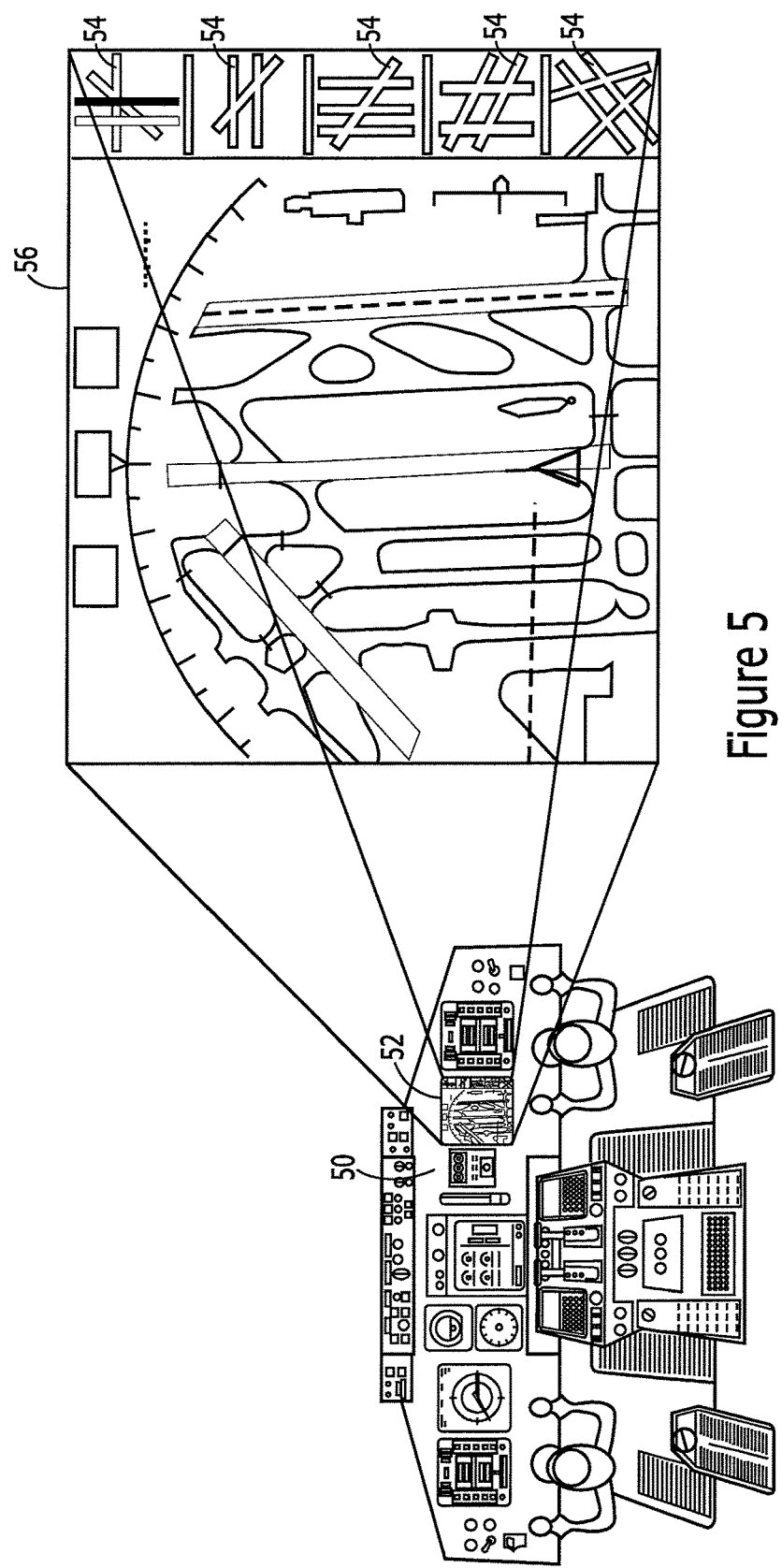

Having thus described certain example embodiments of the present disclosure in general terms, reference will hereinafter be made to the accompanying drawings, which are not necessarily drawn to scale, and wherein:

FIG. 1 is a representation of an airport map;

FIG. 2 is a block diagram of a computing system specifically configured in accordance with an example embodiment of the present disclosure;

FIG. 3 illustrates a data record representative of a map of a port of interest including attributes having corresponding categories and values;

FIG. 4 is a flowchart illustrating operations performed, such as by the computing system of FIG. 2, in accordance with an example embodiment of the present disclosure; and FIG. 5 illustrates the information presented via the user interface of a computing system so as to provide information regarding maps of other ports that have been identified to be similar to a port of interest in accordance with an example embodiment of the present disclosure.

DETAILED DESCRIPTION

Some embodiments of the present disclosure will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A computing system, method and computer program product are provided in order to identify one or more maps of other ports that are similar to the map of a port of interest. Based upon this determination of similarity, information regarding the one or more maps of other ports that have been identified to be similar is provided along with the map of the port of interest. As such, a user may efficiently familiarize oneself with the map of the port of interest by reference to the similarities of the map of the port of interest to the maps of other ports that are similar thereto and with which the user may already be familiar. Consequently, the map of the port of interest may be reliably utilized even in instances in which the user is otherwise relatively unfamiliar with the map of the port of interest.

The computing system, method and computer program product may analyze a variety of different types of maps including maps of airports, maps of harbors or other types of docks or maps of other types of ports supporting different modes of transportation. For purposes of explanation, but not of limitation, the computing system, method and computer program product will be described herein in conjunction with maps of an airport. One example of an airport map 10 is shown in FIG. 1, which presents a birds-eye view of an airport. The airport map 10 depicts runways 12 and taxiways 14 as well as other visible elements. The airport map 10 may also provide an indication of the aircraft 16 and a route 17 to be taken by the aircraft, such as from its current location on a runway 12 to the terminal 18. Further, the airport map 10 may highlight obstacles, such as a point of intersection 19 of two runways 12. The airport map 10 of FIG. 1 is provided as an example, and other airport maps may illustrate additional or different features.

The identification of similar maps to the map of a port of interest and the provision of information regarding the maps of other ports that have been found to be similar may provide navigational assistance, such as to a pilot navigating about an airport. However, the identification of similar maps of other ports may be performed for other reasons including general educational purposes or training purposes. Additionally, while the computing system, method and computer program product of an example embodiment may identify maps of other ports that are similar to the map of a port of interest during or in advance of navigation about the port of interest and, as such, may be performed onboard a vehicle, such as an aircraft, a ship or the like, the computing system, method and computer program product of another example embodiment may be embodied by a simulator, such as a flight simulator, utilized for training purposes.

The computing system configured to identify one or more similar maps of other ports relative to the map of a port of interest may be embodied by a computer system of a vehicle to be navigated about the port of interest, such as an aircraft. In this regard, the computing system of an example embodiment may be embodied by a navigation computer system onboard an aircraft. Alternatively, the computer system may be embodied by a portable computer, such as a laptop computer, a tablet computer, a personal computer or the like, which, in some embodiments may be onboard navigation system or route management system, e.g., flight management system, and/or other onboard computer systems prior to or following a flight. In yet other embodiments, the computer system may be embodied by the computer system of a simulator, such as a flight simulation computer system.

Regardless of the manner in which the computing system is embodied, the computing system 20 of an example embodiment may be configured as shown in FIG. 2 so as to include, be associated with or otherwise be in communication with processing circuitry 22, a memory device 24 and a user interface 26. In some embodiments, the processing circuitry 22 may be in communication with the memory device 24 via a bus for passing information among components of the computing system 20. The memory device 24 may be non-transitory and may include, for example, one or more volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processing circuitry 22). The memory device 24 may be configured to store information, data, content, applications, instructions, or the like for enabling the computing system 20 to carry out various functions in accordance with an example embodiment of the present disclosure. For example, the memory device 24 could be configured to buffer input data for processing by the processing circuitry 22. Additionally or alternatively, the memory device 24 could be configured to store instructions for execution by the processing circuitry 22.

The processing circuitry 22 may be embodied in a number of different ways. For example, the processing circuitry 22 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

In an example embodiment, the processing circuitry 22 may be configured to execute instructions stored in the memory device 24 or otherwise accessible to the processing circuitry. Alternatively or additionally, the processing circuitry 22 may be configured to execute hard coded functionality. As such, whether configured by hardware or software methods, or by a combination thereof, the processing circuitry 22 may represent an entity (e.g., physically embodied in circuitry) capable of performing operations according to an embodiment of the present disclosure while configured accordingly. Thus, for example, when the processing circuitry 22 is embodied as an ASIC, FPGA or the like, the processing circuitry may be specifically configured hardware for conducting the operations described herein. Alternatively, as another example, when the processing circuitry 22 is embodied as an executor of instructions, the instructions may specifically configure the processor to perform the algorithms and/or operations described herein when the instructions are executed. The processing circuitry 22 may include, among other things, a clock, an arithmetic logic unit (ALU) and logic gates configured to support operation of the processing circuitry.

The user interface 26 may also be in communication with the processing circuitry 22 to provide a presentation of information regarding one or more maps of other ports that have been identified as being similar to the map of the port of interest. As such, the user interface 26 may include, for example, a display, a touch screen or other output mechanisms and, in some embodiments, may also include input mechanisms, such as a keyboard, a mouse, a joystick, a microphone or the like. For example, the user interface 26 may be embodied by a by the instrument panel of an aircraft, such as a flight deck display. The processing circuitry 22 may comprise user interface circuitry configured to control at least some functions of one or more user interface elements through computer program instructions (e.g., software and/or firmware) stored on a memory accessible to the processing circuitry (e.g., memory device 24 and/or the like).

The memory device 24 of an example embodiment also includes a plurality of data records representative of respective maps of a plurality of ports, such as airports. The maps generally include a plurality of elements and symbologies. The elements represent various objects, typically visible objects, at a respective airport. For example, elements may include, but are not limited to, runways, runway identifiers, deicing identifiers, land and hold short operation lines, taxiways, taxiway identifiers, parking stand areas, parking stand identifiers, airport beacons, helipads, service roads, taxiway holding positions, construction areas, runway intersections, deicing areas, terminal identifiers, runway markings, water, runway displaced areas and aprons. Symbologies are symbols, terms and/or nomenclature that users of a map, such as pilots and air traffic controllers in relation to the map of an airport, utilize in communication with one another. For example, 15R (e.g., Runway 15 Right) may be the name of a particular runway 12 and is an example of symbology utilized by pilots and air traffic controllers in their communication with one another.

As noted above, the elements of a map represent respective objects. Each object serves as an attribute of the map and each attribute may, in turn, be associated with a category and a corresponding value. One example of a data record 30 representative of a map of an airport designated XYZ including a plurality of attributes having respective categories and values is shown in FIG. 3. In this regard, the categories of attributes include buildings, runways, terminal identifiers, fire station, taxiways, water, runway intersections, taxiway identifiers, service roads, helipad and parking restriction. Since the attributes and, in turn, the categories of the attributes are dependent upon the objects represented by a map, data records representative of other maps may have additional or different attributes and, as a result, additional or different categories and values. The corresponding values may be either numeric or non-numeric, such as text or alphanumeric characters as shown in FIG. 3. In an instance in which the values are non-numeric, the values may represent the geometrical shape of the attribute or other information associated with the respective attribute, such as a descriptor. The attribute values may represent data that is stored in memory, such as the memory device 24 or another database in communication with the computing system 20. The data represented by the attribute values may be structured or unstructured. In this regard, structured data is defined by its structure and, as a result, is data that satisfies a predefined data model and resides in a fixed field. Generally, structured data has a predefined form and may be of a predefined type, such as numeric or non-numeric. Structured data may be identified, for example, by column names and tags, such as eXtensible Markup Language (XML) tags. Conversely, unstructured data is data that is not relational and is not constrained by a predefined data model so as to have no predefined form and, indeed, may be free form.

The attributes may represent tangible objects, such as buildings, runways, etc., or intangible information that is associated with a map. Intangible data is data that is not amenable to be being measured or predicted, at least not based upon historical information. To facilitate the association of intangible data with a map of a port, the intangible data may be unstructured data such that a wide variety of data may be associated therewith. The intangible data may represent any of a wide variety of different types of unstructured data including unstructured data relating to employment issues, landing conditions, turbulence, work stoppages, work slowdowns, information gathered from pilots who previously navigated the airport, e.g., pilot logs, comments from air travelers posted, for example, on social media or the like. As will be apparent, each of these different types of unstructured data may impact the navigation about an airport.

One example of intangible and oftentimes unstructured information is a rule associated with an airport and, as such, associated with a map of an airport. Various rules may be associated with an airport including rules defining the manner in which different elements of the airport, such as a runway or taxiway, are to be utilized, defining different operational requirements depending upon the time of day or weather conditions, or the like. Like attributes representative of tangible objects, attributes representative of intangible information, such as rules, may also be associated with respective categories and values may be assigned thereto.

The unstructured data may be processed in various manners. For example, the computing system 20, such as the processing circuitry 22, may be configured to parse the unstructured data so as to identify words, phrases or other separable portions of the unstructured data. Additionally, the computing system 20, such as the processing circuitry 22, may be configured to extract certain words, phrases or other separable portions of the unstructured data, such as to identify various parts of speech, such as nouns, verbs, adjectives, adverbs, etc., and/or to identify particular key words or numeric values. Following processing of the unstructured data, the map of a port may include a plurality of attribute categories having numeric or non-numeric attribute values drawn from the structured data, as well as attribute categories which identify the various parts of speech and attribute values drawn from the unstructured data. By way of example, the rules associated with an airport may be parsed to identify the rules associated with different categories, such as a category of speed limits with the value then being the numerical speed limit imposed by the rule as shown in FIG. 3, a category defining the priority of usage of a taxiway with the value being the relative priority of the aircraft or the like.

Referring now to FIG. 4, a flowchart illustrating operations performed, such as by the computing system 20 of an example embodiment, is depicted. As shown in block 40, the computing system 20, such as the processing circuitry 22, is configured to receive an indication of a map of a port of interest. In relation to an aircraft, a pilot or other personnel responsible for the assignment of the destination airport or another airport of interest may provide input identifying the airport of interest. Alternatively, the processing circuitry 22 may receive an indication of a map of a port of interest based upon a predefined flight path for the aircraft, such as may be received from the onboard navigation computer or route management system, e.g., flight management system, in which the destination airport serves as the port of interest. Based upon the indication that is received, the processing circuitry 22 can then identify the map of the port of interest, such as by retrieving the map or information associated therewith from the memory device 24. For example, the processing circuitry 22 can retrieve from the memory device a representation of the map as well as the data record associated with the map that identifies various attributes of the map along with their respective categories and values.

As shown in block 42 of FIG. 4, the computing system 20, such as the processing circuitry 22, of this example embodiment is also configured to compare attributes representative of the map of the port of interest to attributes representative of one or more maps of other ports. In relation to airports, the processing circuitry 22 is configured to compare attributes, such as one or more runways, one or more taxiways or other attributes representative of an airport map of the airport of interest, to comparable attributes representative of one or more airport maps of other airports. The processing circuitry 22 is configured to compare a variety of different attributes including, in instances in which rules are associated with the maps, those attributes representative of the rules of the port of interest relative to the attributes representative of the rules of one or more other ports.

The computing system 20, such as the processing circuitry 22, is further configured to identify at least one of the one or more maps of the other ports that satisfies a similarity threshold based upon the comparison of the attributes. See block 44. The similarity threshold may be defined in a variety of manners including a numerical threshold that defines the minimum number of attributes that are to be matched for the maps to be considered similar or the minimum score required for maps to be considered similar, such as in an instance in which the various attributes are weighted and a similarity score is generated as a result of the comparison as described below.

In the embodiments in which the attributes include a category and a corresponding value, the processing circuitry 22 of an example embodiment is configured to compare the attributes by comparing the category of an attribute representative of the map of the port of interest to the category of a corresponding attribute representative of one or more maps of other ports. In an instance in which the categories match, such as by being identical or otherwise being predefined to be matching, the processing circuitry 22 is configured to compare the value associated with the category of the attribute representative of the map of the port of interest to the value associated with the category of the corresponding attribute representative of one or more maps of other ports. In an instance in which the respective values match, such as by being identical or being within a predefined range or percentage of one another, the attributes of the maps undergoing the comparison will be correspondingly considered to match. However, in instances in which the values do not match, the attributes of the maps undergoing the comparison are considered not to match.

The computing system 20, such as the processing circuitry 22, of an example embodiment may be configured to determine a score associated with each map having one or more matching attributes, such that the related map may be ranked, such as from the map that is identified to be the most related as a result of having the greatest score to the map that is identified to be related, but the least related, as a result of having the lowest score. A score may be determined in various manners including as a count of the number of attributes that are determined to match. In some embodiments, this count may be normalized based upon the largest number of attribute categories and values that were determined to match for many of the related maps, such that the maximum score is 1.0.

In an example embodiment, the computing system 20, such as the processing circuitry 22, is configured to assign different weights to at least some of the attribute categories and to identify the related map(s) based at least in part upon the differently weighted attribute categories. The computing system 20, such as the processing circuitry 22, may be configured to weight the different attribute categories itself, such as based upon the uniqueness of an attribute category that is found to match, such that an attribute category having a value that has only a single match among the other maps is more greatly weighted than an attribute category having a value that is found to match many other maps. Additionally or alternatively, the processing 22 circuitry in combination with the user interface 26 of an example embodiment may be configured to present a graphical display that permits a user to assign a weight to be associated with one or more of the attribute categories of the maps. For example, the graphical display may identify one or more of the different categories of attributes and permit a user to provide an indication of the weight, such as low, medium or high or a numerical value within a predefined range, that should be associated with the respective category of attributes.

In order to identify one or more related maps based at least in part upon the differently weighted attribute categories, the computing system 20, such as the processing circuitry 22, of this example embodiment may be configured to assign a score to each of the plurality of other maps based upon the number of attribute values that are found to match as modified by the respective weights of the matching attribute categories. For example, each attribute value that is found to match may contribute to the score in an amount defined by 1× weight, wherein the weight is the numerical weight, generally between 0 and 1, assigned to the respective attribute category. The weighted contributions to the score from each of the matching attribute values may be summed and, in some embodiments, normalized, in order to produce the score for a respective map. The computing system 20, such as the processing circuitry 22, may then identify the other maps to be related based upon their respective scores, such as by identifying all other maps having a score greater than a predetermined threshold to be a related map.

As shown in block 46 of FIG. 4 the computing system 20, such as the user interface 26, typically in response to instructions provided by the processing circuitry 22, is configured to provide information regarding the at least one of the one or more maps of other ports that have been identified to satisfy the similarity threshold along with the map of the port of interest. The information provided by the user interface 26 may have a variety of forms. In one embodiment, however, maps of the other ports that have been found to satisfy the similarity threshold may be presented along with the map of the port of interest. In this embodiment and as shown in FIG. 5 in which the user interface 26 is embodied by an instrument panel 50, such as the instrument panel of an aircraft and, more particularly, by a flight deck display 52, the maps 54 of the other ports may be presented in smaller windows and/or at a smaller scale than the map 56 of the port of interest. If desired, a user, such as a pilot, may select one of the maps 54 of other ports in order to cause the map of the other port to be displayed in a larger window or at a larger scale and, in some instances, to cause additional information associated with the map of the other port to be presented. If rules are associated with the map of the other port, the map 54 of the other port may be displayed to not only graphically represent the other port, but to also identify the rules associated with the other port, such as providing text representative of the rules along with the graphical representation of the map. As shown in FIG. 5, the information provided regarding the maps 54 of the other ports may also include a visible indication to highlight one or more elements of the maps of the other ports that are in common, such as being the same as or within the predefined range, of one or more corresponding elements of the map 56 of the port of interest. With respect to FIG. 5, for example, visible indications are provided in relation to the map 54 of the other port that is in the upper right corner of the display indicating runways that are in common with, such as being the same as, corresponding runways of the map of the port of interest. In addition to the indication of visual elements that are in common between the maps, an indication of the rules associated with the map 54 of the other port that are in common with, such as by being the same as or similar to, the rules associated with the map 56 of the port of interest may be provided, such as by highlighting the rules that are in common between the maps.

By referencing the information regarding the maps of other ports that have been identified to be to satisfy a similarity threshold relative to the map of the port of interest, a user, such as a pilot, may efficiently and reliably familiarize oneself with and interpret the map of the port of interest by considering the map of the port of interest in light of the maps that have been identified to be similar and with which the user, such as the pilot, may already be familiar. This familiarization includes not only familiarization with the overall layout of the airport, but also with the rules that govern use of the airport and which may have been found to be similar to the rules of other airports with which the pilot may be familiar. Thus, a pilot may more efficiently and safely utilize a map of an airport of interest even if the pilot was initially unfamiliar with the map of the airport of interest, such as in an instance in which the aircraft has been diverted to a different airport.

The computing system 20, method and computer program product offer technical advantages in that the processing circuitry 22 is configured to compare attributes and to identify related maps in an efficient manner. As such, the processing resources and power consumption are reduced in comparison to that otherwise consumed by a computing system in an effort to identify related maps. In this regard, the computing system 20 efficiently identifies and presents maps of other ports that have been found to be similar to the map of a port of interest, thereby avoiding the consumption of processing resources otherwise required to support the searching performed by a pilot to individually search for and review each of a plurality of different maps of ports with which they are familiar in a processing-intensive effort to identify similar maps.

As described above, FIG. 4 illustrates a flowchart of a computing system 20, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of a computing system 20 employing an embodiment of the present invention and executed by a processing circuitry 22 of the computing device. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computing system, comprising:
processing circuitry configured to:
receive an indication of a map of a port of interest;
compare attributes representative of the map of the port of interest to attributes representative of one or more maps of other ports; and
identify at least one of the one or more maps of other ports to satisfy a similarity threshold based upon a comparison of the attributes; and
a user interface responsive to the processing circuitry and configured to provide information regarding the at least one of the one or more maps of other ports along with the map of the port of interest.

2. The computing system of claim 1, further comprising a navigation system or a route management system that comprises the processing circuitry, and an instrument panel comprising the user interface.

3. The computing system of claim 1, wherein the map of the port of interest comprises an airport map of an airport of interest, and wherein the one or more maps of other ports of interest comprise one or more airport maps of other airports.

4. The computing system of claim 1,
wherein the port of interest and the other ports have unstructured information associated therewith, and
wherein the processing circuitry is further configured to compare attributes representative of the unstructured information of the port of interest to attributes representative of the unstructured information of one or more other ports.

5. The computing system of claim 4,
wherein the unstructured information comprises a plurality of rules associated with the port of interest and the other ports, and
wherein the processing circuitry is further configured to compare attributes representative of the rules of the port of interest to attributes representative of the rules of one or more other ports.

6. The computing system of claim 1,
wherein the processing circuitry is configured to identify at least one of the one or more maps of other ports by identifying the at least one of the one or more maps of other ports that are most similar to the map of the port of interest.

7. The computing system of claim 1,
wherein the user interface is configured to provide information regarding the at least one of the one or more maps of other ports by providing a visible indication of one or more features of the at least one of the one or more maps of other ports for which information is provided that are in common with one or more corresponding features of the map of the port of interest.

8. The computing system of claim 1,
wherein at least some of the attributes comprise a category and a corresponding value, and
wherein the processing circuitry is configured to compare attributes by comparing the category of an attribute representative of the map of the port of interest to the category of a corresponding attribute representative of one or more maps of other ports and, in an instance in which the categories match, comparing the value associated with the category of the attribute representative of the map of the port of interest to the value associated with the category of the corresponding attribute representative of one or more maps of other ports.

9. A method of a navigation system or a route management system, comprising:
receiving an indication of a map of a port of interest;
comparing attributes representative of the map of the port of interest to attributes representative of one or more maps of other ports;
identifying at least one of the one or more maps of other ports to satisfy a similarity threshold based upon a comparison of the attributes; and
causing information regarding the at least one of the one or more maps of other ports to be provided via a user interface along with the map of the port of interest.

10. The method of claim 9,
wherein the map of the port of interest comprises an airport map of an airport of interest, and wherein the one or more maps of other ports of interest comprise one or more airport maps of other airports.

11. The method of claim 9,
wherein the port of interest and the other ports have unstructured information associated therewith, and
wherein the method further comprises comparing attributes representative of the unstructured information of the port of interest to attributes representative of the unstructured information of one or more other ports.

12. The method of claim 11,
wherein the unstructured information comprises a plurality of rules associated with the port of interest and the other ports, and
wherein the method further comprises comparing attributes representative of the rules of the port of interest to attributes representative of the rules of one or more other ports.

13. The method of claim 9,
wherein identifying at least one of the one or more maps of other ports comprises identifying the at least one of the one or more maps of other ports that are most similar to the map of the port of interest.

14. The method of claim 9,
wherein causing information regarding the at least one of the one or more maps of other ports to be provided comprises providing a visible indication of one or more features of the at least one of the one or more maps of other ports for which information is provided that are in common with one or more corresponding features of the map of the port of interest.

15. The method of claim 9,
wherein at least some of the attributes comprise a category and a corresponding value, and wherein comparing attributes comprises comparing the category of an attribute representative of the map of the port of interest to the category of a corresponding attribute representative of one or more maps of other ports and, in an instance in which the categories match, comparing the value associated with the category of the attribute representative of the map of the port of interest to the value associated with the category of the corresponding attribute representative of one or more maps of other ports.

16. A computer program product comprising a non-transitory computer readable storage medium, the non-transitory computer readable storage medium comprising instructions that, when executed by a navigation system or a route management system, are configured to:
receive an indication of a map of a port of interest;
compare attributes representative of the map of the port of interest to attributes representative of one or more maps of other ports;
identify at least one of the one or more maps of other ports to satisfy a similarity threshold based upon a comparison of the attributes; and
cause information regarding the at least one of the one or more maps of other ports to be provided via a user interface along with the map of the port of interest.

17. The computer program product of claim 16,
wherein the map of the port of interest comprises an airport map of an airport of interest,
wherein the one or more maps of other ports of interest comprise one or more airport maps of other airports, and
wherein the attributes comprise one or more runways or one or more taxiways.

18. The computer program product of claim 16,
wherein the port of interest and the other ports have a plurality of rules associated therewith, and wherein the instructions are further configured to compare attributes representative of the rules of the port of interest to attributes representative of the rules of one or more other ports.

19. The computer program product of claim 16,
wherein the instructions configured to provide information regarding the at least one of the one or more maps of other ports comprise instructions configured to provide a visible indication of one or more features of the at least one of the one or more maps of other ports for which information is provided that are in common with one or more corresponding features of the map of the port of interest.

20. The computer program product of claim 16,
wherein at least some of the attributes comprise a category and a corresponding value, and
wherein the instructions configured to compare attributes comprise instructions configured to compare the category of an attribute representative of the map of the port of interest to the category of a corresponding attribute representative of one or more maps of other ports and, in an instance in which the categories match, instructions configured to compare the value associated with the category of the attribute representative of the map of the port of interest to the value associated with the category of the corresponding attribute representative of one or more maps of other ports.

* * * * *